No. 660,910.  
B. G. LAMME.  
SYSTEM OF ELECTRICAL DISTRIBUTION.  
(Application filed Apr. 14, 1900.)
Patented Oct. 30, 1900.
(No Model.)
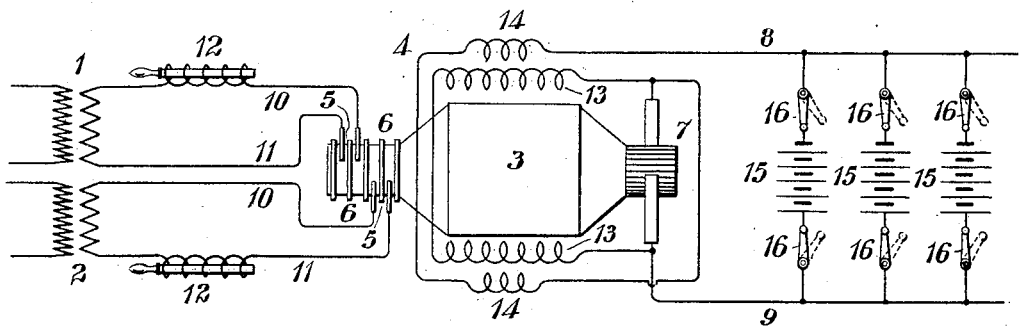
WITNESSES:
C. L. Belcher
Birney Hines
INVENTOR
Benjamin G. Lamme
BY
Shirley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 660,910, dated October 30, 1900.

Application filed April 14, 1900. Serial No. 12,922. (No model.)

*To all whom it may concern:*

Be it known that I, BENJAMIN GARVER LAMME, a citizen of the United States, residing at Pittsburg, in the county of Allegheny and State of Pennsylvania, have invented a new and useful Improvement in Systems of Electrical Distribution, of which the following is a specification.

My invention relates to systems of electrical distribution, and particularly to such systems as involve the transformation of alternating currents into direct currents for supplying translating devices.

The object of my invention is to provide an automatically-operating and reliable means for varying the direct-current electromotive force supplied to translating devices by rotary converters in accordance with changes in the amount or character of the load on the direct-current circuit. With this end in view I have devised the means shown in the accompanying drawing, in which the single figure is a diagrammatic view, the primary windings of which receive their energy from a suitable source of two-phase alternating currents. (Not shown.)

The armature 3 of a rotary converter 4 receives alternating currents from the secondaries of the transformers 1 and 2 through brushes 5 and collector-rings 6 in the usual manner and supplies direct-current energy through a commutator 7 to the direct-current mains 8 and 9. Each of the circuits 10 and 11, which connect the corresponding brushes 5 with the secondaries of the transformers 1 and 2, is provided with an inductive resistance, indicated as a choke-coil 12, which will be designed and proportioned in accordance with the range of direct-current electromotive force desired for the mains 8 and 9, as will be hereinafter more fully set forth.

The rotary converter 4 is provided with a shunt field-magnet winding 13 and with a series field-magnet winding 14, the latter being, however, so arranged and connected that its magnetizing effect opposes that of the shunt-winding.

Assuming that the system of distribution shown is to be employed for charging secondary batteries 15—three of such batteries being connected, as indicated, across the circuit 8 9 by means of switches 16—it is obviously desirable that the electromotive force of the charging-circuit shall increase as the charging progresses in order to overcome the increasing counter electromotive force of the batteries. It is for the purpose of bringing about this result that I provide the apparatus shown. It is obvious that when the battery or batteries are receiving a maximum amount of current and are exerting a minimum counter electromotive force the series winding 14 of the rotary converter will exercise its maximum magnetizing effect, and consequently that the resulting magnetic field of the rotary converter will be a minimum. As the charging operation progresses less current will flow through the series coils and more through the shunt-coils of the converter, and this serves to advance the current with reference to the impressed electromotive force in the alternating-current circuit supplying the transformer, and thus increases the direct-current electromotive force. This increase in resultant magnetization and consequent adjustment of the phase between the current and impressed electromotive force will increase as the charging of the batteries progresses, and consequently the direct-current electromotive force will be gradually increased as demanded by the condition of the batteries.

The relative number of turns of the series and shunt field-magnet windings of the converter and the arrangement and adjustment of the several parts of the system in general may obviously be made such as is desired for any particular installation or so as to most nearly meet general requirements, as will be readily understood by those skilled in the art.

While my invention is well adapted for use in connection with the charging of secondary batteries and has been so illustrated, I desire it to be understood that it is not limited to such use, but may be employed wherever it is desired to employ a rotary converter for producing variable direct-current electromotive force.

I claim as my invention—

1. In a system of electrical distribution, the combination with an alternating-current circuit containing inductive resistance, of a rotary converter connected to said alternating-current circuit and to a direct-current circuit containing translating devices, said rotary converter having shunt and series field-magnet windings arranged and connected in opposition.

2. In a system of electrical distribution, the combination with an alternating-current circuit containing inductive resistance, of a rotary converter connected to said alternating-current circuit and to a direct-current circuit for charging secondary batteries, said rotary converter having shunt and series field-magnet windings arranged and connected to produce opposing magnetizations.

3. In a system of electrical distribution, the combination with an alternating-current circuit containing inductive resistance, of a rotary converter connected to said alternating-current circuit and a direct-current circuit provided with a variable load requiring a variable electromotive force and supplied by said rotary converter, the latter having shunt and series field-magnet windings arranged and connected to oppositely magnetize the field-magnet core.

In testimony whereof I have hereunto subscribed my name this 12th day of April, 1900.

BENJ. G. LAMME.

Witnesses:
C. L. BELCHER,
BIRNEY HINES.